(12) United States Patent
Tanaka et al.

(10) Patent No.: US 6,721,238 B2
(45) Date of Patent: Apr. 13, 2004

(54) MAGNETO-OPTICAL RECORDING MEDIUM HAVING MULTIPLE MAGNETIC LAYERS CAPABLE OF REDUCING REPRODUCING LASER POWER

(75) Inventors: Yasuhito Tanaka, Tokyo (JP); Yoshihiro Muto, Tokyo (JP)

(73) Assignee: Sony Corporation, Tokyo (JP)

(*) Notice: Subject to any disclaimer, the term of this patent is extended or adjusted under 35 U.S.C. 154(b) by 92 days.

(21) Appl. No.: 09/996,418

(22) Filed: Nov. 29, 2001

(65) Prior Publication Data

US 2003/0123336 A1 Jul. 3, 2003

(30) Foreign Application Priority Data

Nov. 29, 2000 (JP) .................................... P2000-363554

(51) Int. Cl.[7] .............................................. G11B 11/00
(52) U.S. Cl. .............................. 369/13.45; 369/13.46; 428/694 MM
(58) Field of Search .......................... 369/13.45, 13.5, 369/13.35, 13.38, 13.42, 13.46; 428/64.3, 694 ML, 694 MM, 694 SC (56) References Cited

U.S. PATENT DOCUMENTS

| | | | | |
|---|---|---|---|---|
| 5,554,436 A | * | 9/1996 | Katayama et al. | 428/212 |
| 5,635,296 A | * | 6/1997 | Nakayama et al. | 428/332 |
| 5,903,526 A | * | 5/1999 | Tabata | 369/13.42 |
| 5,982,713 A | * | 11/1999 | Nakayama et al. | 369/13.49 |
| 6,180,268 B1 | * | 1/2001 | Tamanoi et al. | 428/694 ML |
| 6,388,956 B1 | * | 5/2002 | Mori et al. | 369/13.43 |

FOREIGN PATENT DOCUMENTS

| | | |
|---|---|---|
| JP | 9-320124 | 12/1997 |
| JP | 9-320134 | 12/1997 |

* cited by examiner

*Primary Examiner*—Tan Dinh
(74) *Attorney, Agent, or Firm*—Sonnenschein, Nath & Rosenthal LLP

(57) ABSTRACT

A magneto-optical recording medium for recording and reproducing carriers by laser beam irradiation includes a first magnetic layer which is magnetized in the in-plane direction at room temperature and is perpendicularly magnetized at a predetermined temperature $T_1$ or more; a second magnetic layer which is in contact with the first magnetic layer, has a Curie temperature $Tc_2$ higher than the predetermined temperature $T_1$, and has in-plane magnetic anisotropy up to the Curie temperature $Tc_2$; a third magnetic layer which has a Curie temperature $Tc_3$ higher than the predetermined temperature $T_1$ and has perpendicular magnetic anisotropy at least in a predetermined range of a temperature distribution of the magneto-optical recording medium during laser beam irradiation when reproducing; and a rare earth metal layer formed between the third magnetic layer and the second magnetic layer.

8 Claims, 7 Drawing Sheets

PRIOR ART

⇧ MAGNETIC FIELD LEAKED
FROM RECORDING LAYER

⬆ MAGNETIZATION

MAGNETO-OPTICAL RECORDING MEDIUM HAVING MULTIPLE MAGNETIC LAYERS CAPABLE OF REDUCING REPRODUCING LASER POWER

RELATED APPLICATION DATA

The present application claims priority to Japanese Application(s). P2000-363554 filed Nov. 29, 2000, which application(s) is/are incorporated herein by reference to the extent permitted by law.

BACKGROUND OF THE INVENTION

1. Field of the Invention

The present invention relates to a magneto-optical recording medium such as a magneto-optical disc, a magneto-optical card, or magneto-optical tape, which is used for a magneto-optical recording and reproducing apparatus.

2. Description of the Related Art

For magneto-optical recording media, many new technologies called magnetically induced super resolution (MSR), which overcome optical limitations caused by the numerical aperture NA of an objective lens and the laser beam wavelength $\lambda$, have been proposed.

In these technologies, the resolution is increased by using the following techniques: providing at least a magnetic recording layer (hereinafter referred to as a recording layer) and a magnetic reproducing layer (hereinafter referred to as a reproducing layer) on a magneto-optical recording medium; generating a temperature distribution in the medium by laser beam irradiation for reproduction, wherein the laser beam is focused on the medium to form a beam spot; transferring, by using the temperature distribution, the magnetization of the recording layer only to a region of the reproducing layer having a specific temperature, wherein the region having the specific temperature is called an aperture; and forming a magnetic mask in another region having a temperature other than the specific temperature. The MSR technologies are excellent in increasing resolution without changing a main parameter, such as optical pickup characteristics, of the magneto-optical recording and reproducing apparatus.

In the MSR technologies, an example of this technology called Center Aperture Detection (CAD), which decreases both the linear density and the recording track width and reduces distortion generated in waveforms of reproduced signals (hereinafter referred to as carriers), is disclosed in the Japanese Unexamined Patent Application Publication No. 9-320134.

Figure 9:
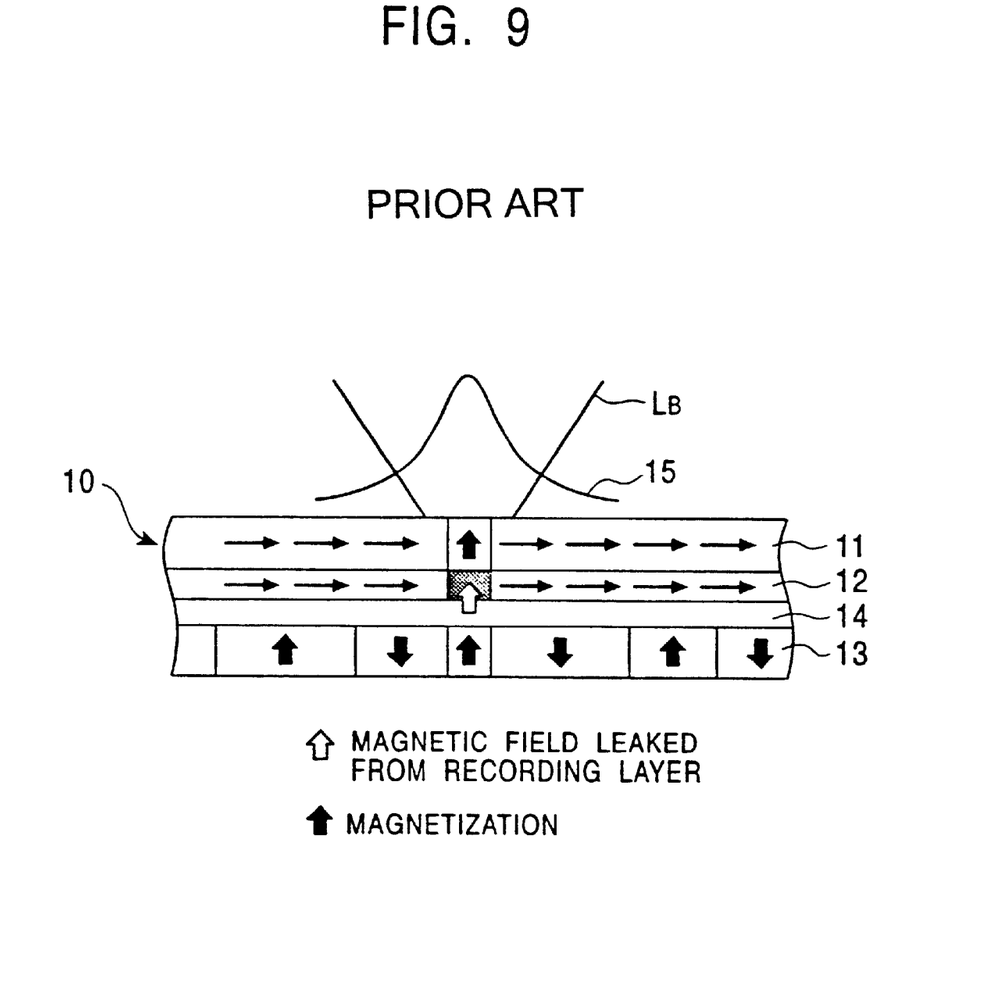
FIG. 9 is a view showing a known magneto-optical recording medium.

Referring to FIG. 9, the reproduction principle of the magneto-optical recording medium disclosed the Japanese Unexamined Patent Application Publication No. 9-320124 will be now described.

The magneto-optical recording medium 10 has the following layers: a reproducing layer 11 of which the magnetic anisotropy changes from a in-plane direction to a perpendicular direction at a predetermined temperature $Tc_1$; an auxiliary reproducing layer 12 which has a Curie temperature $Tc_2$ higher than the predetermined temperature $Tc_1$ and has a in-plane magnetic anisotropy up to the Curie temperature $Tc_2$; a non-magnetic layer 14 composed of an Al alloy, a dielectric material such as SiN or AlN, or the like; and a recording layer 13 having a perpendicular magnetic anisotropy up to the Curie temperature.

In the recording layer 13, magnetic domains having different directions of magnetization are formed according to information. By being irradiated with a reproducing laser beam LB focused with an objective lens or the like into a spot, the temperature distribution generated on the magneto-optical recording medium 10 has a peak at the center of a curve 15 in FIG. 9.

As described above, because the reproducing layer 11 has in-plane magnetic anisotropy in a low temperature range, the magnetic domains of the recording layer 13 are not transferred to a region of the reproducing layer 11 having a low temperature, that is, the region functions as a mask.

In the above temperature range, the exchange coupling force of the auxiliary reproducing layer 12 maintains a strong in-plane magnetic anisotropy to increase mask performance.

On the other hand, a part of the reproducing layer 11 which is in a region of the auxiliary reproducing layer 12 having a higher temperature than the Curie temperature $Tc_2$ is released from the magnetic constraint force of the auxiliary reproducing layer 12 to be formed into the aperture. The magnetic domains of the recording layer 13 are transferred to the resulting aperture by the magnetostatic coupling force of the magnetic field leaking from the recording layer 13.

According to the above reproduction principle, the MSR technology based on CAD increases the resolutions of both the linear density and the recording track width. The technology reduces distortion generated in waveforms of the reproduced carriers because the aperture is located in the vicinity of the center of the laser beam spot.

As described above, CAD is an excellent technology but has the following problems: sensitiveness to disturbances; instability in size of an aperture; and large noise. The problems are caused by using only the aperture having the highest temperature in the temperature distribution generated by laser beam irradiation because the magnetic coupling force is used for transferring the magnetic recording information, namely, magnetic domains, in the recording layer 13.

The strength of the leaked magnetic field varies according to the size of the magnetic domain of the recording layer 13, that is, a leaked magnetic field generated from a long recorded magnetic domain is stronger than another leaked magnetic field generated from a short recorded magnetic domain.

The strength of the leaked magnetic field significantly affects carrier reproduction characteristics of the magnetic domains according to the recorded state thereof. Thus, in particular, when magnetic domains are defective in recording, the long recorded magnetic domain is not perfectly transferred to a reproducing layer. Consequently, the following phenomenon frequently arises: the ratio of the bit error rate to the magnetic recording field is large even if the ratio of the carrier-noise intensity rate to the magnetic recording field or the rate of jitter to the magnetic recording field is small.

SUMMARY OF THE INVENTION

Accordingly, it is an object of the present invention to provide a magneto-optical recording medium which solves the problems described above.

The magneto-optical recording medium for recording and reproducing carriers by laser beam irradiation, according to the present invention, includes a first magnetic layer which is magnetized in the in-plane direction at room temperature and is perpendicularly magnetized at a predetermined temperature $T_1$ or more; a second magnetic layer which is in contact with the first magnetic layer, has a Curie temperature $Tc_2$ higher than the predetermined temperature $T_1$, and has in-plane magnetic anisotropy up to the Curie temperature $Tc_2$; a third magnetic layer which has a Curie temperature $Tc_3$ higher than the predetermined temperature $T_1$ and has perpendicular magnetic anisotropy at least in a predetermined range of a temperature distribution of the magneto-optical recording medium during laser beam irradiation when reproducing; and a rare earth metal layer formed between the third magnetic layer and the second magnetic layer.

The magneto-optical recording medium preferably includes a transparent substrate on which the first magnetic layer, the second magnetic layer, the rare earth metal layer, and the third magnetic layer are deposited in that order.

The rare earth metal layer of the magneto-optical recording medium is preferably composed of Gd.

The rare earth metal layer preferably has a thickness of 1 to 20 nm.

The magneto-optical recording medium preferably includes a fourth magnetic layer in contact with a face of the third magnetic layer away from the rare earth metal layer, wherein the fourth magnetic layer comprises a rare earth-transition metal alloy.

The magneto-optical recording medium of the present invention reproduces carriers with a reduced power, that is, a wide range of power is usable for the magneto-optical disc when reproducing carriers, and thus that is advantageous for designing the driving device for the magneto-optical recording medium such as a magneto-optical disc.

In the magneto-optical recording medium, a small power is usable for reproducing; hence, the aperture used for reproducing carriers is reduced, and miniaturization of the track pitch and high recording density in the linear direction are achieved.

Also, when reproducing carriers, the operation for transferring the magnetic recording domains of the recording layer to the reproducing layer is stable; hence, the ratio of carrier intensity to noise intensity increases.

Furthermore, the magneto-optical recording medium has the following advantages in practical use: improvement of the relationship between jitter and error; reduction of the current used for a magnetic head of the recording and reproducing apparatus; and reduction of electricity consumed by a driving device for the magneto-optical disc.

DESCRIPTION OF THE PREFERRED EMBODIMENT

Figure 1:
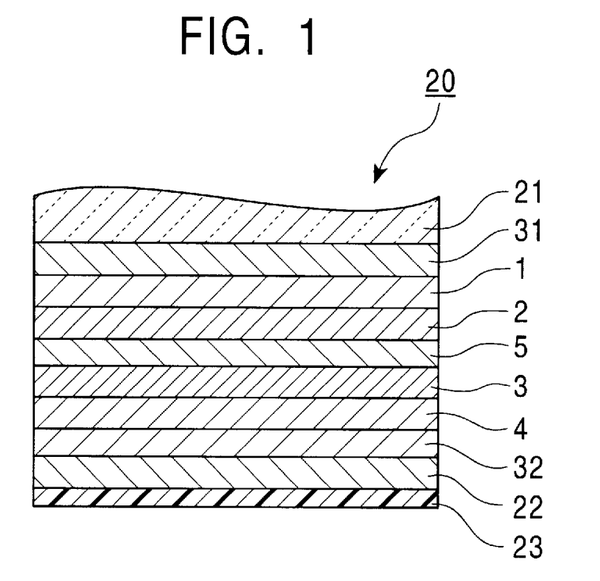
FIG. 1 is a schematic sectional view showing the main part of an exemplary magneto-optical recording medium of the present invention.

FIG. 1 is a schematic sectional view showing an exemplary magneto-optical recording medium of the present invention. The magneto-optical recording medium 20 for recording and reproducing carriers by laser beam irradiation has a first magnetic layer which is magnetized in the in-plane direction at room temperature and is perpendicularly magnetized at a predetermined temperature $T_1$ or more; a second magnetic layer which is in contact with the first magnetic layer and has a Curie temperature $Tc_2$ higher than the predetermined temperature $T_1$ and in-plane magnetic anisotropy up to the Curie temperature $Tc_2$; a third magnetic layer which has a Curie temperature $Tc_3$ higher than the predetermined temperature $T_1$, wherein $T_1 \leq Tc_2 < Tc_3$, and has perpendicular magnetic anisotropy at least in a predetermined range of a temperature distribution of the magneto-optical recording medium during laser beam irradiation when reproducing carriers; and a rare earth metal layer formed between the third magnetic layer and the second magnetic layer.

Referring to FIG. 1, an example of the magneto-optical recording medium 20 of the present invention will be now described.

EXAMPLE

In this example, the following layers were deposited on a transparent substrate 21 composed of polycarbonate in the following order by magnetron sputtering: a first dielectric layer 31, a first magnetic layer 1 functioning as a reproducing layer, a second magnetic layer 2 functioning as an auxiliary reproducing layer, a rare earth metal layer 5, a third magnetic layer 3 functioning as a recording layer, a fourth magnetic layer 4 functioning as an auxiliary recording layer, a second dielectric layer 32, and a heat radiation layer 22. A protective layer 23 was formed on the top of these layers by spin coating.

The first magnetic layer 31 and the second magnetic layer 32 were composed of AlN, and the heat radiation layer 22 was composed of an Al alloy.

The reproducing layer, namely, the first magnetic layer 1, was composed of GdFeCo which has in-plane magnetic anisotropy at room temperature but has perpendicular magnetic anisotropy at high temperature.

The auxiliary reproducing layer, namely, the second magnetic layer 2, was composed of GdFe.

The rare earth metal layer 5 was composed of Gd and had a thickness of 3 nm.

The recording layer, namely, the third magnetic layer 3, was composed of TbFeCo which is generally used for magneto-optical recording media.

The auxiliary reproducing layer, namely, the first magnetic layer 4 composed of GdFeCo functions so as to enhance the magnetic recording field sensitivity, has a smaller coercive force than that of the recording layer 3, and has a higher Curie temperature than that of the recording layer.

The Ar gas pressure used for depositing the recording layer 3 was adjusted to be lower than that used for depositing the reproducing layer in order to enhance the magnetic recording field sensitivity and to stabilize the operation for transferring the magnetic domain of the recording layer 3 to the reproducing layer 1.

COMPARATIVE EXAMPLE 1

Figure 2:
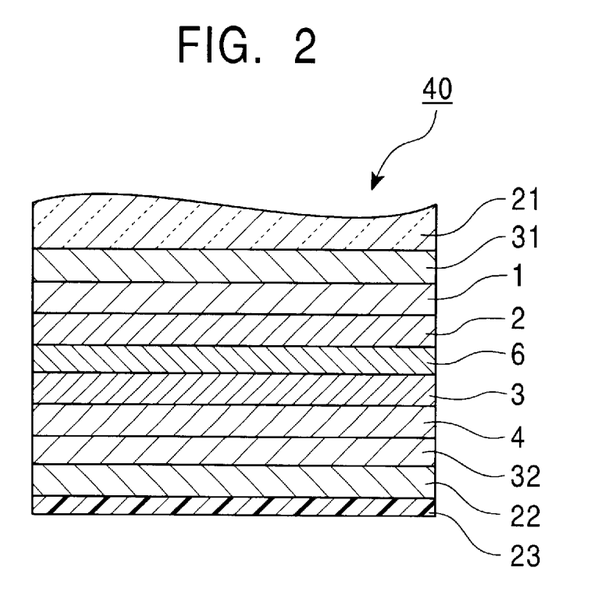
FIG. 2 is a schematic sectional view showing the main part of an exemplary magneto-optical recording medium of COMPARATIVE EXAMPLE 1.

FIG. 2 is a schematic sectional view showing COMPARATIVE EXAMPLE 1 of the magneto-optical recording medium. In this example, the structure disclosed in Japanese Unexamined Patent Application Publication No. 9-320134 described above was modified as follows: an auxiliary reproducing layer 4 was added; and a non-magnetic layer 6 composed of an Al alloy having a thickness of 3 nm was provided instead of the rare earth metal layer 5 of the present invention. The magneto-optical recording medium of the comparative example had the same structure as that of the EXAMPLE except for the non-magnetic layer 6.

For the magneto-optical discs of the EXAMPLE and COMPARATIVE EXAMPLE 1, namely, the magneto-optical recording media 20 and 40, respectively, the dependence of signal intensities of carriers and noise reproduced from repeated marks having a length of 0.24 $\mu$m and 0.97 $\mu$m on the reproducing power was measured. The light spot used in this measurement was obtained by focusing a laser beam having a wavelength of 403 nm with an objective lens having a numerical aperture of 0.6.

Figure 3:
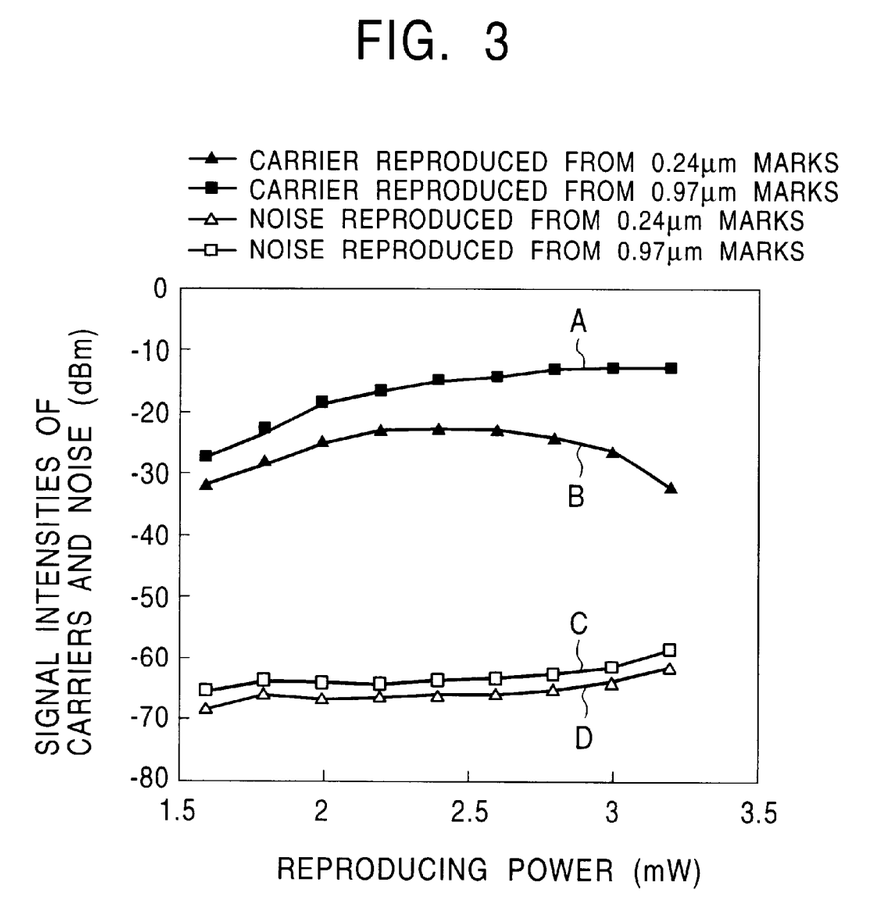
FIG. 3 is a graph illustrating the relationship between the reproducing power for the magneto-optical recording medium of the present invention and the carrier intensity and between the reproducing power and the noise intensity.
Figure 4:
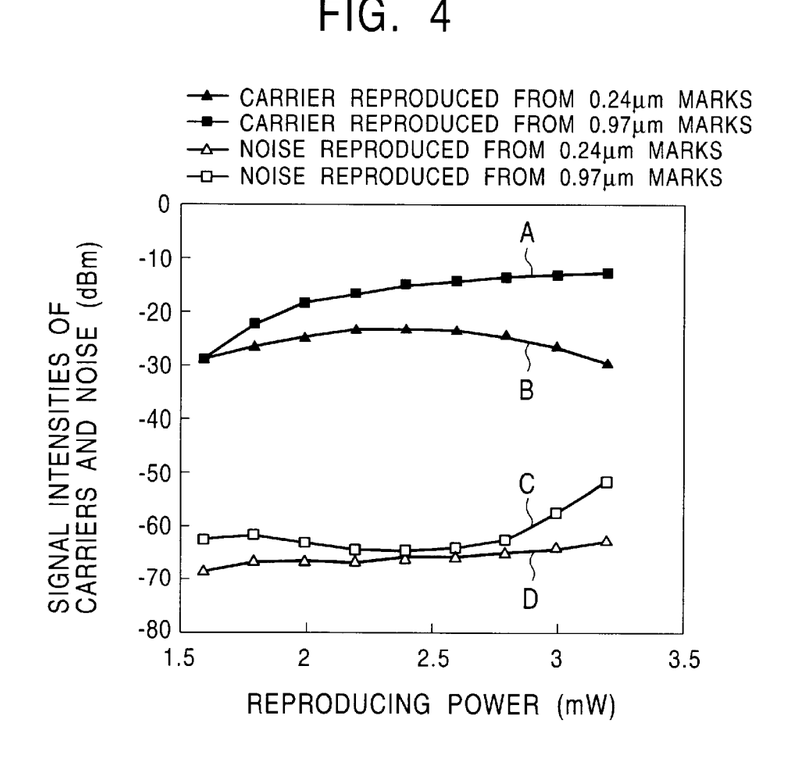
FIG. 4 is a graph illustrating the relationship between the reproducing power for the magneto-optical recording medium of COMPARATIVE EXAMPLE 1 and the carrier intensity and between the reproducing power and the noise intensity.

FIGS. 3 and 4 show the measurement results of the dependence on the magneto-optical discs 20 and 40. The abscissa represents the reproducing power, and the ordinate represents intensities of the reproduced carriers and the reproduced noise. In each figure, Curves A and B show the intensities of the carriers reproduced from the 0.24-$\mu$m and 0.97-$\mu$m repeated marks, respectively. Also, Curves C and D show the intensities of the noise reproduced from the 0.24-$\mu$m and 0.97-$\mu$m repeated marks, respectively.

The optimum reproducing power is 2.6 mW when the magneto-optical discs 20 and 40 with recorded random lengths of carriers have the best reproducing performance.

When the magneto-optical disc 40 is reproduced with a reproducing power of about 1.8 mW, that is, a small reproducing power, noise obtained from the 0.97 $\mu$m marks is large. On the other hand, the magneto-optical disc 20 is reproduced with a reproducing power of about 1.8 mW, that is, a small reproducing power, noise obtained from the 0.97 $\mu$m marks is small.

The results suggest that the magneto-optical disc of the present invention can reproduce carriers with a reduced power, that is, a wide range of power is usable for the magneto-optical disc when reproducing carriers, which is advantageous in designing the driving device for the magneto-optical disc.

Retrieval with a reduced power means that the aperture used for reproducing carriers is small; hence, the track pitch is narrow and the recording density is increased. When the same track pitch as that of the magneto-optical disc disclosed in Japanese Unexamined Patent Application Publication No. 9-320134 described above is used, a wide range of power is usable for reproducing, which is advantageous in designing the driving device for the magneto-optical disc.

COMPARATIVE EXAMPLE 2

Figure 5:
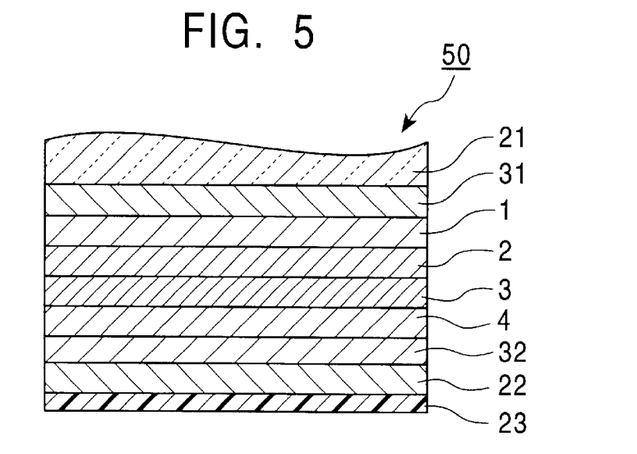
FIG. 5 is a schematic sectional view showing the main part of the magneto-optical recording medium of COMPARATIVE EXAMPLE 2.

FIG. 5 is a sectional view showing the main part of a magneto-optical disc, namely, a magneto-optical recording medium 50 which does not have the rare earth metal layer 5 provided in the magneto-optical disc 20 described above.

Figure 6:
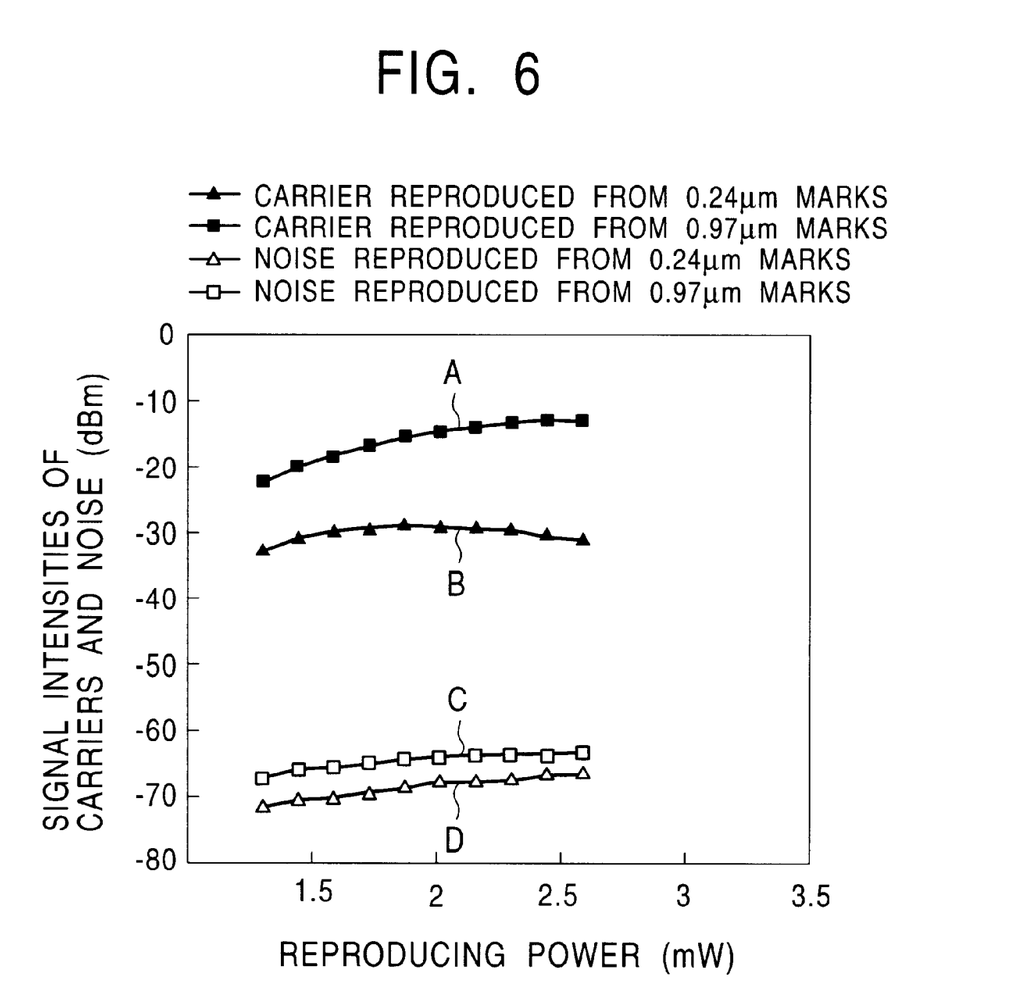
FIG. 6 is a graph illustrating the relationship between the reproducing power for the magneto-optical recording medium of COMPARATIVE EXAMPLE 2 and the carrier intensity and between the reproducing power and the noise intensity.

For the magneto-optical recording medium 50, the dependence of signal intensities of carriers and noise reproduced from 0.24-$\mu$m and 0.97-$\mu$m repeated marks on reproducing power was measured and the results are shown in FIG. 6. In FIG. 6, Curves A and B show the signal intensities of the carriers reproduced from the 0.24-$\mu$m and 0.97-$\mu$m repeated marks, respectively. Also, Curves C and D show the signal intensities of noise reproduced from the 0.24-$\mu$m and 0.97-$\mu$m repeated marks, respectively.

FIG. 6 shows that small reproducing power does not cause the noise to increase, and thus a wide range of power is usable for reproduction. In the magneto-optical disc 50 of COMPARATIVE EXAMPLE 2, the ratio of the intensity of the carrier reproduced from the long mark to that of the other carrier reproduced from the short mark is larger than that of the magneto-optical disc 20 of the present invention. Thus, the mask efficiency during reproduction of carriers, namely, the reproduction resolution is inferior, and the performance desired for a magneto-optical recording medium having high magnetic resolution is inferior. Accordingly, the magneto-optical recording medium of the present invention has a high resolution and is reproduced with a wide range of power.

The signal characteristics of the magneto-optical discs 20 and 40 were measured. In the measurement, a laser beam having a wavelength of 403 nm was focused with an objective lens having a numerical aperture of 0.6, the beam was focused to a spot, and the reproducing power was 2.6 mW. Random signals of RLL (1, 7) modulation were recorded and the density in the linear direction was 0.182 $\mu$m/bit. In the measurement of the bit error rate, partial response equalization and Viterbi decoding were used.

Figure 7:
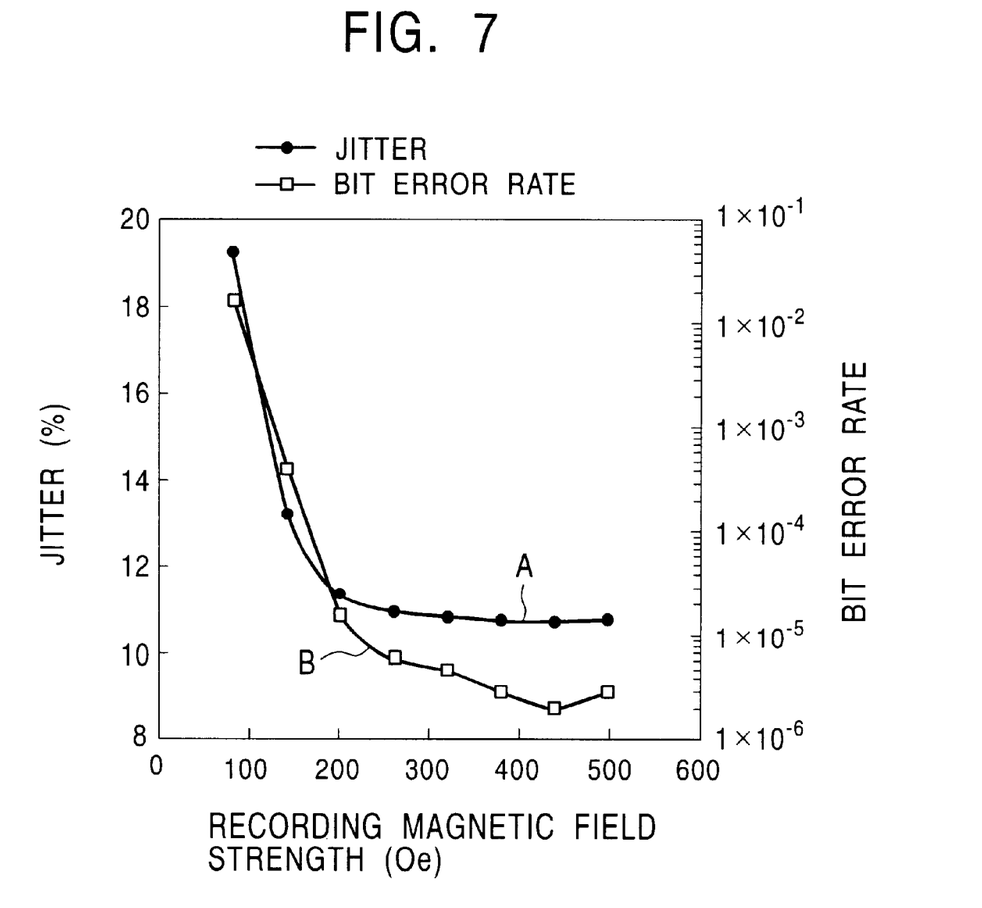
FIG. 7 is a graph illustrating the relationship between the magnetic recording field and jitter and between the magnetic recording field and bit error rate in the magneto-optical recording medium of the present invention.
Figure 8:
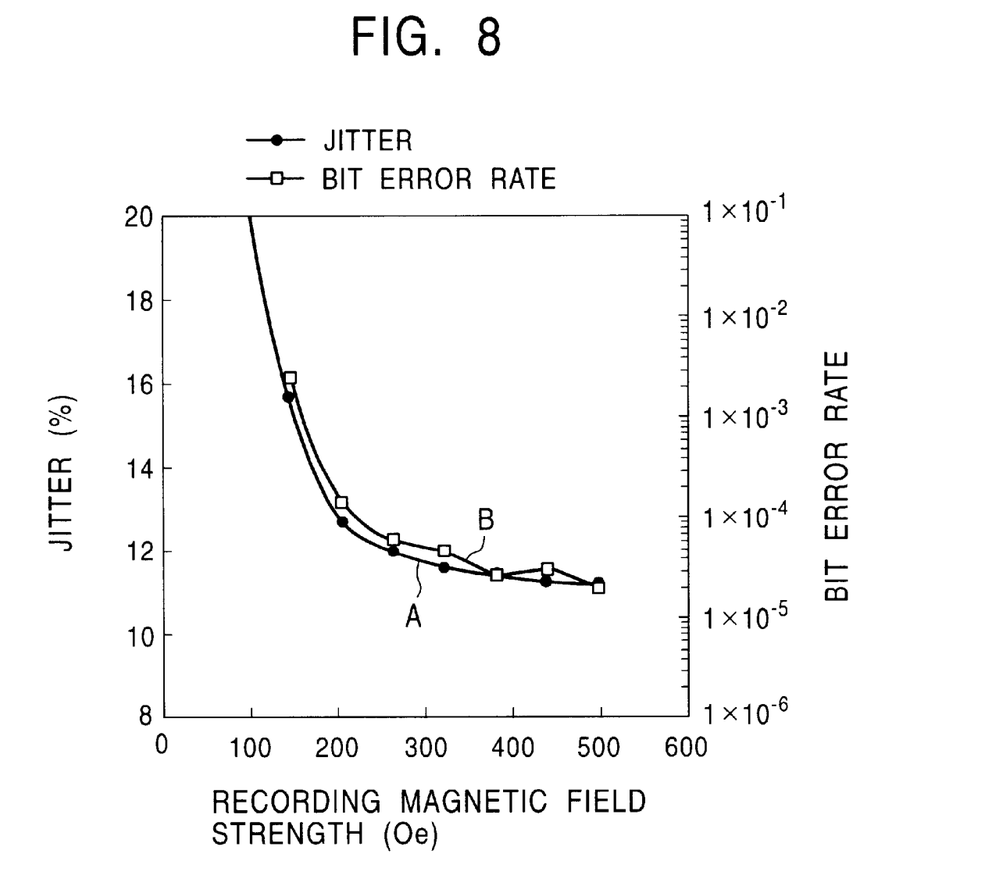
FIG. 8 is a graph illustrating the relation between the magnetic recording field and jitter and between the magnetic recording field and bit error rate in the magneto-optical recording medium of COMPARATIVE EXAMPLE 2.

FIG. 7 shows relationships between the magnetic recording field and the jitter (Curve A) and between the magnetic recording field and the bit error rate (Curve B) in the magneto-optical disc 20. FIG. 8 shows relationships between the magnetic recording field and the jitter (Curve A) and between the magnetic recording field and a bit error rate (Curve B) in the magneto-optical disc 40. The jitter is the standard deviation of the time difference between a clock edge formed from a reproduced carrier and a data edge of a binarized reproduced carrier.

As shown in FIGS. 7 and 8, the jitter of the magneto-optical discs 20 and 40 are substantially same; however, the bit error rate of the magneto-optical disc 20 of the present invention is one order of magnitude smaller than that of the magneto-optical disc 40 ranging over the entire gamut of the magnetic recording field. The results show that the magneto-optical disc 20 of the present invention reliably performs the transferring operation compared with the magneto-optical disc 40; hence, the magneto-optical disc 20 exhibits excellent performance as a digital signal-recording medium.

In the above EXAMPLE, the Gd layer, namely, the rare earth metal layer 5 having a thickness of 3 nm was placed between the recording layer 3 and the auxiliary reproducing layer 2. Magneto-optical recording media were prepared by changing the thickness in the range of 1 to 20 nm and the resulting media exhibited the same performance as that in the EXAMPLE.

As described above, in the magneto-optical recording medium of the present invention, the reproducing power is small and the noise is reduced.

What is claimed is:

1. A magneto-optical recording medium for recording and reproducing carriers by laser beam irradiation, comprising:

a first magnetic layer which is magnetized in the in-plane direction at room temperature and is perpendicularly magnetized at a predetermined temperature T1 or more;

a second magnetic layer which is in contact with the first magnetic layer, has a Curie temperature Tc2 higher than the predetermined temperature T1, and has in-plane magnetic anisotropy up to the Curie temperature Tc2;

a third magnetic layer which has a Curie temperature Tc3 higher than the predetermined temperature T1 and has perpendicular magnetic anisotropy at least in a predetermined range of a temperature distribution of the magneto-optical recording medium during laser beam irradiation when reproducing; and a rare earth metal layer formed between the third magnetic layer and the second magnetic layer.

2. A magneto-optical recording medium according to claim 1, further comprising a transparent substrate on which the first magnetic layer, the second magnetic layer, the rare earth metal layer, and the third magnetic layer are deposited in that order.

3. A magneto-optical recording medium according to claim 1 or 2, wherein the rare earth metal layer comprises Gd.

4. A magneto-optical recording medium according to claim 1 or 2, wherein the rare earth metal layer has a thickness of 1 to 20 nm.

5. A magneto-optical recording medium according to claim 1 or 2, further comprising a fourth magnetic layer in contact with a face of the third magnetic layer away from the rare earth metal layer, wherein the fourth magnetic layer comprises a rare earth-transition metal alloy.

6. A magneto-optical recording medium according to claim 3, wherein the rare earth metal layer has a thickness of 1 to 20 nm.

7. A magneto-optical recording medium according to claim 3, further comprising a fourth magnetic layer in contact with a face of the third magnetic layer away from the rare earth metal layer, wherein the fourth magnetic layer comprises a rare earth-transition metal alloy.

8. A magneto-optical recording medium according to claim 3, wherein the rare earth metal layer has a thickness of 1 to 20 nm.

* * * * *